United States Patent [19]

Affa

[11] Patent Number: 4,818,111
[45] Date of Patent: Apr. 4, 1989

[54] POSITION MEASURING INSTRUMENT

[75] Inventor: Alfred Affa, Stein, Fed. Rep. of Germany

[73] Assignee: Dr. Johannes Heidenhain GmbH, Traunreut, Fed. Rep. of Germany

[21] Appl. No.: 74,524

[22] Filed: Jul. 16, 1987

[30] Foreign Application Priority Data

Aug. 9, 1986 [DE] Fed. Rep. of Germany ....... 3627079

[51] Int. Cl.[4] ............................................... G01B 11/00
[52] U.S. Cl. ...................................... 356/374; 33/707; 250/237 G; 356/375
[58] Field of Search ........................ 356/373, 374, 375; 250/237 G; 33/125 A, 125 C

[56] References Cited

U.S. PATENT DOCUMENTS

| 3,816,003 | 6/1974 | Litka | 33/125 C |
| 4,070,759 | 1/1978 | Nelle | 33/125 C |
| 4,484,391 | 11/1984 | Norimatsu | 33/125 C |
| 4,564,294 | 1/1986 | Ernst | 356/374 |
| 4,700,483 | 10/1987 | Tsujiuchi et al. | 356/125 R |

FOREIGN PATENT DOCUMENTS

| 1548871 | 9/1969 | Fed. Rep. of Germany | 33/125 C |
| 3613755 | 10/1986 | Fed. Rep. of Germany | |
| 2160977 | 1/1986 | United Kingdom | 33/125 C |

OTHER PUBLICATIONS

Gekapseltes Universal-Langenmess-System Walzspalt-Mess-System, Feb. 1982.

Primary Examiner—F. L. Evans
Attorney, Agent, or Firm—Willian Brinks Olds Hofer Gilson & Lione Ltd.

[57] ABSTRACT

A longitudinal position measuring device for measuring the relative positions of two objects comprising a housing, a measuring scale, and a scanning unit for scanning the measuring scale. The housing is attached to one of the objects and a scanning unit is attached to the other of the objects by means of a fastening member and a connecting element. The scanning unit comprises a light source and four photosensitive elements. The measuring signal produced by the scanning unit and power to the light source are conducted by means of a cable through the connecting element and into the fastening member. The fastening member is rotatably mounted to the connecting rod so that the fastening member may be readily attached to the other object such as a machine cradle. The cable extends through a chamber located in the fastening member and is connected to an electrical box from which the scanning signals may be taken for conduction to either a display or an evaluation unit. The chamber is dimensioned to allow a sufficient length of cable to be stored so that undesirable stresses on the cable are not exerted during rotation of the fastening member about the connecting rod.

10 Claims, 1 Drawing Sheet

POSITION MEASURING INSTRUMENT

BACKGROUND OF THE INVENTION

The present invention relates to a position measuring instrument for measuring the relative position of two relatively movable objects comprising a connecting element for connecting the scanning unit to one of the objects.

Position measuring instruments of this type are frequently used in numerically controlled machine equipment to determine the relative position of a workpiece and tool. The measuring scale is fixed relative to one of the workpiece and tool and a scanning unit is fixed relative to the other of the workpiece and tool. The scanning unit scans the measuring scale to produce a measuring signal. The attachment is such that relative movement between the workpiece and tool causes relative movement between the scanning unit and measuring scale.

A longitudinal position measuring instrument of this type is disclosed in the brochure published by Dr. Johannes Heidenhein GmbH, Traunreut, West Germany, entitled: *"Encased Universal Longitudinal Measuring System ULS, Roll Opening System WMS"*, February 1982 edition. The instrument comprises a glass measuring scale which is scanned by a photoelectric scanning unit using transmitted light. The scanning unit is mounted in a housing and may traverse the length of the measuring scale along the measuring direction with little or no friction. The instrument also comprises a light source and four photosensitive elements. The light source is positioned on one side of the measuring scale and the four photosensitive elements, displaced relatively to one another, are positioned on the opposite side of the measuring scale. A cable conducts the scanning signals away from the photosensitive elements and supplies power to the light source. One end of the cable is connected to the scanning unit and the other end is connected to a box, which serves as a connector module, mounted on the housing.

During relative movements between the scanning unit and the housing, the distance between the scanning unit and the box is constantly changing. The changing distance means that the cable extending between the scanning unit and the box is constantly being moved. In order for these movements to take place without interfering with the measuring operation, a space is provided within the interior of the housing. However, a disadvantage arises in that the housing is required to be of increased size.

An additional disadvantage of this type of system, is that movements of the cable in a confined space within the housing may lead to damage of the cable and thereby result in failure of the measuring instrument.

A longitudinal measuring instrument is also disclosed in German Patent Application P No. 36 13 755.3 (DE-OS No. 36 13 755), which is not a prior printed publication to this invention, in which a glass graduation is scanned photoelectrically by a scanning unit fastened to a rod. The glass graduation is connected to a first object and the rod is connected to a second object, such as a machine base, movable relatively to the first object. The rod contains an axial bore through which a wire lead passes to connect the scanning unit with the outside. The wire lead protrudes out of the axial bore in an undefined manner. This results in a disadvantage in that tensile stresses may be exerted on the wire lead resulting in undesirable forces being exerted on the scanning unit.

It is an object of the present invention to provide a measuring instrument of the above-mentioned type which is compactly constructed and in which reliable performance is assured.

SUMMARY OF THE INVENTION

The present invention relates to a measuring instrument for measuring the relative position of two relatively movable objects of the type comprising a measuring scale attached to one of the objects, a scanning unit for scanning the measuring scale and a connecting element for attaching the scanning unit to the other of the objects.

In a preferred embodiment of the present invention, the element connecting the scanning unit to the other of the objects comprises a longitudinal bore through which a cable is run from the scanning unit to a fastening member positioned on the object. The fastening member is rotatably mounted about the connecting element and comprises a chamber into which the cable passes. One end of the cable is connected to the scanning unit. The other end of the cable is connected to a connector mounted on a side of the fastening member. The chamber is of sufficient size to allow a length of the cable to wind in a spiral configuration, allowing the fastening member to be rotated about the connecting element without exerting substantial forces on the cable.

One particular advantage of a preferred embodiment of the present invention is that the wire cable between the scanning unit and the connector module is rigidly attached. This avoids wear and tear on the wire leads and helps prevent failure of the measuring instrument. An additional advantage is that the invention enables the measuring instrument to be compactly constructed since the fastening member houses the wire leads. The fastening member can be added to any fastenable surface by virtue of its angular mobility without substantially exerting undesirable forces on the connecting element or on the scanning unit.

The invention itself, together with further objects and attendant advantages, will best be understood by reference to the following detailed description, taken in conjunction with the accompanying drawings.

DETAILED DESCRIPTION OF THE PREFERRED EMBODIMENT

Figure 1:
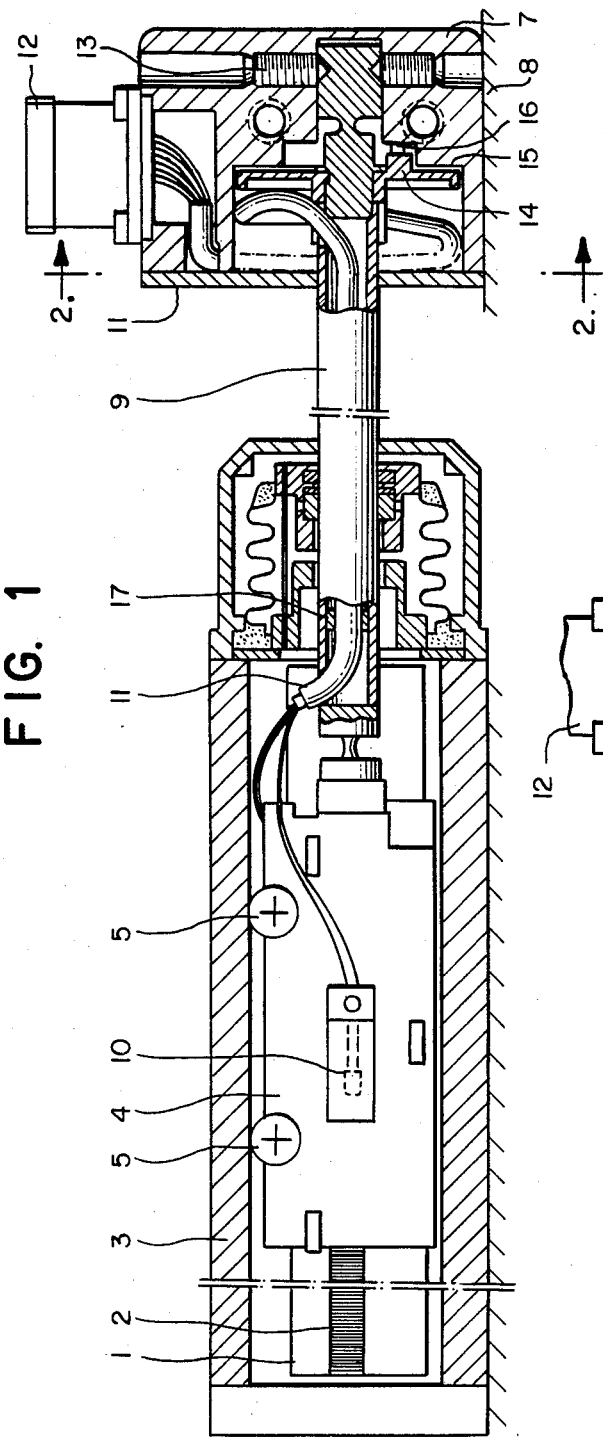
FIG. 1 is a sectional representation of a preferred embodiment of a longitudinal position measuring instrument of the present invention.
Figure 2:
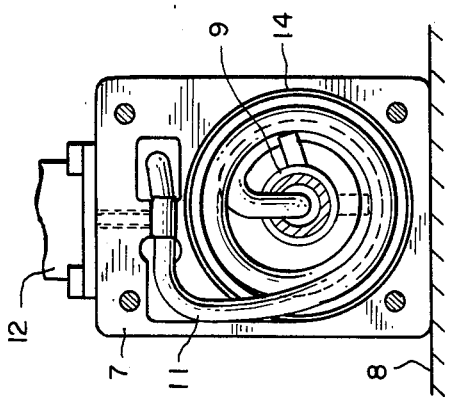
FIG. 2 is a sectional representation of the embodiment shown in FIG. 1 taken along lines II—II.

Turning now to the drawings, FIG. 1 shows a sectional representation of the preferred embodiment of the longitudinal position measuring instrument. The instrument comprises a housing 3, a glass graduated scale 1, and a scanning unit 4. The graduated scale 1 is bonded to the housing 3 and includes an incremental graduation 2 which defines a measuring direction. The photoelectric scanning unit 4 is movable along the graduated scale 1 and along the inner surface of the housing 3 in the measuring direction by means of substantially frictionless rollers 5. To measure the relative position of two machine parts, the housing 3 is mounted on the base of a machine 6 and a fastening member 7 is mounted on a machine cradle 8. A connecting rod 9 connects the fastening member 7 with the scanning unit 4 so that relative movements of the machine cradle 8 in the measuring direction are transferred to the scanning unit 4.

The scanning unit 4 comprises a light source 10 and four photosensitive elements, not shown, displaced relatively to one another in the measuring direction. During scanning, the light emitted by the light source 10 is modulated by the incremental graduation 2 and the modulated light detected by the four photosensitive elements.

In the preferred embodiment, the connecting rod 9 comprises a hollow passageway through which a cable 11 extends between the scanning unit 4 and the fastening member 7. The cable 11 supplies power to the light source 10 and conduction paths for the scanning signals produced by the photosensitive elements. An electrical box 12 is fastened to the fastening member 7 and connected to the electrical leads of one end of the cable 11. Since the distance between the scanning unit 4 and the electrical box 12 remains constant, the cable remains at rest during movements in the measuring direction of the housing 3 relative to the fastening member 7. A connecting cable may be attached to the electrical box 12 by means of an electrical connector. Electrical lines from an external power source as well as electrical lines to a display or an evaluation unit can be integrated into this connecting cable.

The fastening member 7 is block-shaped and mounted to the connecting rod 9 to be rotatable about the longitudinal axis of the connecting rod 9. This allows the fastening member 7 to be fastened in a convenient manner to the machine cradle 8. The electrical box 12, located on the fastening member 7, can be designed and constructed to fulfill corresponding requirements and offset any design flaws on the surface of the machine base 6 or machine cradle 8.

After the measuring instrument has been attached to the machine, the fastening member 7 is firmly attached to the connecting rod 9 by screws 13. Of course, if desired, the fastening member 7 could be attached to the connecting rod 9 in a manner to allow rotation of the fastening member about the longitudinal axis of the connecting rod 9 during the measurement process. This would avoid measurement errors caused by lead errors of the machine parts without exerting unacceptable forces on the connecting rod 9 and consequently on the scanning unit 4. It is necessary of course in this preferred embodiment that the connection between the fastening member 7 and the connecting rod 9 be rigid in the measuring direction.

The cable 11 extends into a chamber within the fastening member 7 from an opening in the side of the connecting rod 9. The cable 11 extends through the opening and chamber and is connected to the electrical box 12. The chamber is sufficiently dimensioned to allow the cable 11 to form one or more loops to assure unhindered rotational movement of the fastening member about the longitudinal axis of the connecting rod 9. The radius of the loops in the cable 11 is dependent upon the angular position of the fastening member 7. A plate 14, fixedly attached to the connecting rod 9, gives cable 11 a preferred direction in forming the loops. Of course, embodiments of the invention without the plate 14 may be desirable.

A first stop element 15 located on the plate 14 and a second stop element 16 located on the fastening member 7 cooperate to limit the rotational movements of the fastening member 7 to approximately 360°. The stop elements 15, 16 ensure that no unacceptable tensile stresses are exerted on the cable 11.

A seal 17 is located between the connecting rod 9 and the cable 11 to prevent moisture and dust from entering the housing 3.

Although not shown, it should be understood that the electrical box 12 could also be attached on the surface of or within the fastening member 7 perpendicular to the longitudinal axis of the connecting rod 9. It is also possible that the electrical box 12 be fastened to the end of the connecting rod 9 whereby the box 12 itself is constructed as an expandable connecting module.

Of course, it should be understood that a wide range of changes and modifications can be made to the preferred embodiments described above. It should be also understood that the invention is not limited to the incremental photoelectric measuring instrument shown. The present invention may be used with other measuring instruments as for example, capacitive, magnetic and inductive mechanisms of either incremental or absolute types. In addition, the scanning signals, which are conducted from the scanning unit to the fastening member, do not have to be electrical. Other transmittable signals could be used, as for example, light beam signals. Of course, the lead wires would have to be constructed in a corresponding manner, such as light beam wave guides in the named example. It is therefore intended that the foregoing detailed description be regarded as illustrative rather than limiting, and that it be understood that it is the following claims, including all equivalents, which are intended to define the scope of this invention.

I claim:

1. In a measuring instrument for measuring the relative position of two relatively movable objects, the instrument of the type comprising a housing attached to one of the objects; a measuring scale; and a scanning unit for scanning the measuring scale to produce at least one measuring signal, the improvement comprising:

a fastening member adapted to be fixedly attached to the other of the objects, the fastening member defining a chamber;

a connecting member defining a first end, a second end, and a passageway extending substantially the length of the connecting member, the first end connected to the scanning unit, the second end passing through the housing and connected to the fastening member such that the passageway is connected with the chamber; and signal conduction means for conducting the measuring signal to a region external to the measuring instrument, the signal conduction means extending from the scanning unit through the passageway of the connecting member and into the chamber of the fastening member;

the signal conduction means and the fastening member cooperating to allow the signal conduction means to lie in a configuration such that the fastening member may be substantially rotated about the connecting member.

2. The invention of claim 1 wherein the signal conduction means comprises at least one wire.

3. The invention of claim 1 wherein the signal conduction means comprises at least one light beam wave guide.

4. The invention of claim 1 wherein the signal conduction means and the fastening member cooperate to allow the fastening member to rotate approximately 360° about the connecting member.

5. The invention of claim 1 wherein the chamber of the fastening member is adapted to receive at least one spiral loop of the signal conduction means; wherein the fastening member defines a side; and wherein the signal conduction means exits from the side of the fastening member.

6. The invention of claim 1 further comprising a connector means located on the fastening member and connected to the signal conduction means.

7. In a position measuring instrument for measuring the relative position of two relatively movable objects, the measuring instrument of the type comprising a housing fastened to one of the objects; a measuring scale located within the housing; and a scanning unit for scanning the measuring scale and producing at least one measuring signal, the improvement comprising:

a fastening member adapted to be fixedly attached to the other of the objects, the fastening member defining a chamber;

a connecting rod defining a first end, a second end, an axial bore extending substantially the length of the connecting rod, a first opening into the axial bore located near the first end, and a second opening into the axial bore located near the second end, the first end connected with the scanning unit, the second end passing through the housing and into the chamber such that the fastening member is rotatable about the connecting rod and the second opening is in communication with the chamber; and a cable connected with the scanning unit for conducting the measuring signal and extending into the first opening, through the axial bore, out the second opening, into the chamber, and fixedly fastened relative to the fastening member with sufficient amounts of cable being located within the chamber to allow the fastening member to be rotated relative to the connecting rod.

8. The invention of claim 7 wherein the cable is formed in at least a partial spiral loop within the chamber.

9. The invention of claim 7 wherein the improvement further comprises a plate operative to direct the cable into at least a partial spiral configuration within the chamber.

10. In a longitudinal position measuring instrument for measuring the relative position of two relatively movable objects, the instrument of the type comprising a housing fastened to one of the objects; a measuring scale located within the housing; a scanning unit for scanning the measuring scale to produce at least one measuring signal; and a cable connected to the measuring unit to conduct the measuring signal, the improvement comprising:

a fastening member fixedly attached to the other of the objects;

means for rigidly supporting and housing the cable between the scanning unit and the fastening member; and means located within the fastening member to allow the fastening member to rotate relative to the scanning unit without exerting substantial stress on the cable and scanning unit.

* * * * *